US011479487B2

(12) United States Patent
Holtz et al.

(10) Patent No.: US 11,479,487 B2
(45) Date of Patent: Oct. 25, 2022

(54) STORMWATER MANAGEMENT SYSTEM WITH INTERNAL BYPASS

(71) Applicant: Oldcastle Infrastructure, Inc., Atlanta, GA (US)

(72) Inventors: James Ferguson Holtz, Portland, OR (US); Christopher Ryan Demarest, Livermore, CA (US)

(73) Assignee: Oldcastle Infrastructure, Inc., Atlanta, GA (US)

( * ) Notice: Subject to any disclaimer, the term of this patent is extended or adjusted under 35 U.S.C. 154(b) by 0 days.

(21) Appl. No.: 16/756,359

(22) PCT Filed: Oct. 17, 2018

(86) PCT No.: PCT/US2018/056324
§ 371 (c)(1),
(2) Date: Apr. 15, 2020

(87) PCT Pub. No.: WO2019/079479
PCT Pub. Date: Apr. 25, 2019

(65) Prior Publication Data
US 2021/0024389 A1 Jan. 28, 2021

Related U.S. Application Data

(60) Provisional application No. 62/573,574, filed on Oct. 17, 2017.

(51) Int. Cl.
*C02F 3/04* (2006.01)
*C02F 103/00* (2006.01)
(52) U.S. Cl.
CPC ........ *C02F 3/043* (2013.01); *C02F 2103/001* (2013.01); *C02F 2203/006* (2013.01)

(58) Field of Classification Search
CPC ............... C02F 3/043; C02F 2103/001; C02F 2203/006; E03F 5/14; Y02W 10/10; B01D 24/461; B01D 24/24
(Continued)

(56) References Cited

U.S. PATENT DOCUMENTS 3,469,698 A 9/1969 Blendermann
4,162,147 A * 7/1979 Haverkamp ............... C02F 1/20
210/220

(Continued)

FOREIGN PATENT DOCUMENTS

WO WO 2010/118110 A9 10/2010
WO WO2014/201223 A1 12/2014
WO WO2019/079479 A1 4/2019

OTHER PUBLICATIONS

PCT Notification of Transmittal of the International Search Report and the Written Opinion of the International Searching Authority, or the Declaration for International application No. PCT/US2018/056324, dated Jan. 2, 2019 (16 pages).

(Continued)

*Primary Examiner* — Nam X Nguyen
*Assistant Examiner* — Ekandra S. Miller-Cruz (57) ABSTRACT

The invention provides structures, methods, and assemblies for bioretention systems, including tree box filters with one or more internal bypass features incorporated into the tree box filter. The invention also provides methods and additional structures that are useful for managing stormwater flow and inhibiting the flow of pollutants, debris, and other contaminants into drainage systems.

14 Claims, 8 Drawing Sheets

(58) Field of Classification Search
USPC .................................................. 210/747.3
See application file for complete search history.

(56) References Cited

U.S. PATENT DOCUMENTS

| | | | |
|---|---|---|---|
| 4,537,687 A | 8/1985 | Piper | |
| 4,682,907 A | 7/1987 | Gaudin | |
| 5,322,629 A | 6/1994 | Stewart | |
| 5,433,845 A | 7/1995 | Greene et al. | |
| 5,437,786 A | 8/1995 | Horsley | |
| 5,549,817 A | 8/1996 | Horsley | |
| 5,569,387 A | 10/1996 | Bowne | |
| 5,624,576 A | 4/1997 | Lenhart et al. | |
| 5,702,593 A | 12/1997 | Horsley | |
| 5,707,527 A | 1/1998 | Knutson et al. | |
| 5,728,305 A | 3/1998 | Hawkinson | |
| 5,744,048 A | 4/1998 | Stetler | |
| 5,759,415 A | 6/1998 | Adams | |
| 5,788,848 A | 8/1998 | Blanche et al. | |
| 5,855,775 A | 1/1999 | Kerfoot | |
| 5,985,157 A | 11/1999 | Leckner et al. | |
| 6,027,639 A | 2/2000 | Lenhart, Jr. et al. | |
| 6,132,603 A | 10/2000 | Mokrzycki | |
| 6,277,274 B1 | 8/2001 | Coffman | |
| 6,350,374 B1 | 2/2002 | Stever et al. | |
| 6,383,373 B1 | 5/2002 | Nakao et al. | |
| 6,406,218 B1 | 6/2002 | Olson | |
| 6,511,595 B2 | 1/2003 | Crompton et al. | |
| 6,531,059 B1 | 3/2003 | Morris et al. | |
| 6,569,321 B2 | 5/2003 | Coffman | |
| 6,641,720 B1 | 11/2003 | Crompton et al. | |
| 6,649,048 B2 | 11/2003 | de Ridder et al. | |
| 6,652,743 B2 | 11/2003 | Wallace et al. | |
| 6,676,832 B2 | 1/2004 | de Bruijn | |
| 6,783,683 B2 | 8/2004 | Collings | |
| 6,797,161 B2 | 9/2004 | Use et al. | |
| 6,881,338 B2 | 4/2005 | Austin et al. | |
| 6,905,599 B2 | 7/2005 | Allard | |
| 6,991,114 B2 | 1/2006 | Allen, II et al. | |
| 6,991,402 B2 | 1/2006 | Burkhart | |
| 6,991,734 B1 | 1/2006 | Smith et al. | |
| 6,998,038 B2 | 2/2006 | Howard | |
| 7,022,243 B2 | 4/2006 | Bryant | |
| 7,080,480 B2 | 7/2006 | Urban et al. | |
| 7,083,721 B2 | 8/2006 | McClure et al. | |
| 7,101,476 B2 | 9/2006 | Kim | |
| 7,160,058 B2 | 1/2007 | Burkhart | |
| 7,186,058 B2 | 3/2007 | Schluter et al. | |
| 7,186,333 B2 | 3/2007 | Kluge | |
| 7,237,981 B1 | 7/2007 | Vitarelli | |
| 7,294,256 B2 | 11/2007 | Happel et al. | |
| 7,296,692 B2 | 11/2007 | Allen, II et al. | |
| 7,297,266 B2 | 11/2007 | Cobb et al. | |
| 7,344,335 B2 | 3/2008 | Burkhart | |
| 7,425,261 B2 | 9/2008 | Siviter et al. | |
| 7,425,262 B1 | 9/2008 | Kent | |
| 7,441,661 B2 | 10/2008 | Phillips | |
| 7,470,362 B2 | 12/2008 | Kent | |
| 7,473,373 B1 | 1/2009 | Danler | |
| 7,510,649 B1 | 3/2009 | Lavigne | |
| 7,582,216 B2 | 9/2009 | Amott et al. | |
| 7,625,485 B2 | 12/2009 | Siviter et al. | |
| 7,638,065 B2 | 12/2009 | Stever | |
| 7,674,378 B2 | 3/2010 | Kent | |
| 7,686,956 B1 | 3/2010 | Casebier | |
| 7,776,217 B2 | 8/2010 | Lucas | |
| 7,833,412 B2 | 11/2010 | Holtz | |
| 7,967,979 B2 | 6/2011 | Grewal et al. | |
| 7,985,335 B2 | 7/2011 | Allard | |
| 8,012,346 B2 | 9/2011 | Peters, Jr. et al. | |
| 8,110,105 B2 | 2/2012 | Allen, II | |
| 8,113,740 B2 | 2/2012 | Boulton et al. | |
| 8,157,991 B2 | 4/2012 | Wilhelms et al. | |
| 8,287,728 B2 | 10/2012 | Kania et al. | |
| 8,303,816 B2 | 11/2012 | Kent et al. | |
| 8,318,015 B2 | 11/2012 | Allen, II et al. | |
| 8,333,885 B1 | 12/2012 | Iorio | |
| 8,501,016 B2 | 8/2013 | Lord | |
| 8,535,533 B2 | 9/2013 | Allard | |
| 8,555,586 B2 | 10/2013 | Lowe et al. | |
| 8,591,729 B2 | 11/2013 | Alqanee | |
| 8,622,647 B2 | 1/2014 | Flood, Jr. et al. | |
| 8,679,327 B2 | 3/2014 | Mellott et al. | |
| 8,795,518 B2 | 8/2014 | Alsaffar | |
| 8,911,626 B2 | 12/2014 | Allard | |
| 8,980,083 B2* | 3/2015 | Hutchings | E03F 5/0404 |
| | | | 210/150 |
| 9,469,981 B2 | 10/2016 | Allard | |
| 9,506,233 B2 | 11/2016 | Allard | |
| 9,512,606 B2 | 12/2016 | Allard | |
| 9,540,799 B2 | 1/2017 | Allard | |
| 10,118,846 B2 | 11/2018 | Holtz et al. | |
| 10,696,573 B2 | 6/2020 | Holtz et al. | |
| 2002/0057944 A1 | 5/2002 | Adams et al. | |
| 2003/0089652 A1 | 5/2003 | Matsui et al. | |
| 2003/0121846 A1 | 7/2003 | Use et al. | |
| 2004/0226869 A1 | 11/2004 | McClure et al. | |
| 2004/0251185 A1 | 12/2004 | Pitt et al. | |
| 2005/0285011 A1 | 12/2005 | Harwood | |
| 2006/0151387 A1 | 7/2006 | Yost et al. | |
| 2007/0068878 A1 | 3/2007 | Stever et al. | |
| 2007/0199869 A1 | 8/2007 | Al-Assfour | |
| 2007/0256966 A1* | 11/2007 | Siviter | E03F 5/12 |
| | | | 210/150 |
| 2007/0262009 A1 | 11/2007 | Fitzgerald | |
| 2008/0121564 A1 | 5/2008 | Smith et al. | |
| 2008/0121594 A1 | 5/2008 | Dierkes | |
| 2008/0217227 A1 | 9/2008 | Pank | |
| 2008/0217257 A1 | 9/2008 | Pank | |
| 2008/0251448 A1 | 10/2008 | Kent | |
| 2009/0050583 A1 | 2/2009 | Arnott et al. | |
| 2009/0127176 A1* | 5/2009 | Cummins | C02F 3/2806 |
| | | | 210/255 |
| 2009/0218299 A1 | 9/2009 | Cote | |
| 2009/0250405 A1 | 10/2009 | Allard | |
| 2010/0206790 A1 | 8/2010 | Holtz | |
| 2011/0147303 A1 | 6/2011 | Allard | |
| 2011/0168612 A1 | 7/2011 | Happel | |
| 2011/0186492 A1 | 8/2011 | Holtz | |
| 2012/0031854 A1 | 2/2012 | Allard | |
| 2012/0152827 A1 | 6/2012 | Allard | |
| 2012/0158727 A1 | 6/2012 | Larsen et al. | |
| 2013/0001158 A1 | 1/2013 | Condon et al. | |
| 2013/0056399 A1 | 3/2013 | Downare | |
| 2013/0092632 A1 | 4/2013 | Allard | |
| 2013/0105387 A1 | 5/2013 | Antoinette et al. | |
| 2013/0180903 A1 | 7/2013 | Kowalsky | |
| 2013/0213869 A1 | 8/2013 | Allard | |
| 2014/0001127 A1 | 1/2014 | Hymel et al. | |
| 2014/0124424 A1 | 5/2014 | Chai et al. | |
| 2014/0202954 A1 | 7/2014 | Lassovsky | |
| 2014/0367328 A1 | 12/2014 | Allard | |
| 2016/0176732 A1 | 6/2016 | Holtz et al. | |
| 2016/0319963 A1 | 11/2016 | Banks et al. | |
| 2019/0001158 A1 | 1/2019 | Bergfijord et al. | |
| 2019/0039927 A1 | 2/2019 | Holtz et al. | |

OTHER PUBLICATIONS

PCT Notification Concerning Transmittal of Copy of International Preliminary Report on Patentability (Chapter I of the Patent Cooperation Treaty) for International application No. PCT/US2018/056324, dated Apr. 30, 2020 (10 pages).
KriStar Enterprises, Inc., TREEPODTM Biofilter documents, with date Mar. 13, 2009, Mar. 3, 2009 (8 pages).
CONTECH Construction Products Inc., "UrbanGreenTM BioFilter Design, Operation and Performance," 2009 (4 pages).
CONTECH Construction Products Inc., "UrbanGreenTM BioFilter Apr. 2009" (11 pages).
CONTECH Construction Products Inc., UrbanGreen BioFilter Standard Detail documents (8 pages).
Standard Detail Filterra Curb Inlet with Internal Bypass documents, with date Mar. 3, 2011, Apr. 4, 2011 (4 pages).

(56) References Cited

OTHER PUBLICATIONS

"Filterra Curb Inlet with Internal Bypass" documents, undated (7 pages).
Rain Guardian, "Four Stages of Pretreatment (U.S. Pat. No. 8,501,016)," screen shot from http://www.rainguardian.biz/index.php?option=option=com_content&view=articale&id=66<emind=103, printed on Jan. 2, 2014 (2 pages).
"Services Plaza Stormwater Project," Government Engineering, 40-41, May-Jun. 2007 (2 pages).
TERRE Hili Stormwater Systems, slides entitled Gray Complements Green, Gray + Green Treatment Train Design: Targets Multiple Urban Pollutants Reduces Maintenance Costs Extends Useful Life of Green Ingrastructure Minimizes Urban Blight Enhances Quality of Urban Life, dated Oct. 10, 2012, downloaded on Jan. 2, 2014 from http://berkscd.com/wp-content/uploads2012/10/Gray-Complements-Green.pdf (8 pages).

\* cited by examiner

STORMWATER MANAGEMENT SYSTEM WITH INTERNAL BYPASS

CROSS REFERENCE TO RELATED APPLICATIONS

This application claims the benefit of International Application No. PCT/US2018/056324, filed on Oct. 17, 2018, which claims the benefit of U.S. Provisional Application No. 62/573,574, filed on Oct. 17, 2017. These prior applications, including the entire written descriptions and drawing figures, are hereby incorporated into the present application by reference in their entirety.

FIELD OF THE INVENTION

The present invention relates to systems, methods, and components for stormwater management, including vault systems, bioretention systems, tree box filters, and related methods and components that are useful for the control of stormwater runoff and the removal of pollutants, debris, and other contaminants from stormwater runoff.

BACKGROUND OF THE INVENTION

Stormwater runoff occurs when precipitation, such as precipitation from rainwater or melted snow, runs off streets, lawns, driveways, rooftops, roads, and other surfaces. In developed or re-developed areas, impervious surfaces such as pavement, roads, and roofs, cover the ground and prevent precipitation from soaking into the ground. As a result, water is allowed to accumulate and run into storm drains, sewer systems, and drainage systems before entering local streams, lakes, wetlands, rivers, and other receiving bodies. The accumulation of stormwater runoff can cause flooding and erosion. In addition, stormwater may carry pollutants commonly found on paved surfaces, such as sediments, ultrafine pollutants, dissolved pollutants, oil and grease, debris, and trash.

Many regulations require the implementation of stormwater management systems to help control stormwater runoff in a developed or redeveloped site. Stormwater management systems may include bioretention systems, such as tree box filters or tree box planters, which are a low-impact development (LID) approach to land development or redevelopment. Bioretention systems utilize soils and both woody and herbaceous plants to remove pollutants from stormwater runoff They are designed to mimic a site's natural (i.e., predevelopment) flow using techniques such as infiltration, storage, filtration, evaporation, and detention to treat runoff close to its source. Stormwater treatment systems may include other vault systems, such as those using media cartridges and/or other filtration systems, to process stormwater and allow for the infiltration, storage, and treatment of stormwater.

The entrance of gross pollutants, such as trash, debris, floatables, and coarse sediments, may "clog" systems and increase the maintenance frequency. Ideally, stormwater treatment systems should allow for effective filtration of gross pollutants from incoming stormwater prior to releasing it. Another concern is the ability of stormwater management systems to accommodate peak or increased fluid flow. There exists a need for bypass structures that allow excess fluids to proceed through the drainage system with minimal processing during periods of high fluid flow. In some instances, it may also be desirable for a stormwater management system that allows for infiltration of stormwater to the surrounding soil and other areas.

Further, for effective land usage costs, stormwater treatment systems should maximize the treatment surface area (for instance, the treatment bed surface area in bioretention systems), while minimizing the "footprint" occupied by the systems. It also may be desirable for the systems to be flexible and accommodate practical structural needs, such as the presence of surrounding landscape features.

Accordingly, there is a need for a stormwater system that incorporates at least some or all of the foregoing features for effective stormwater management in developed or re-developed sites.

BRIEF SUMMARY OF THE INVENTION

The present invention is related to structures, methods, and assemblies for bioretention systems, including tree box filters that may have one or more internal bypass features incorporated into the tree box filter.

An apparatus for use in a bioretention system is described. The apparatus comprises a substantially rectangular enclosure comprising an inlet opening and four sidewalls, a tray in fluid communication with the inlet opening, a treatment compartment disposed downstream from the tray, and an outlet compartment disposed at a corner of the enclosure, downstream from the tray. The tray is defined at least in part by a first weir adjoining adjacent sidewalls of the enclosure and a second weir adjoining adjacent sidewalls of the enclosure. The treatment compartment comprises treatment media and is adapted to receive stormwater flowing past the first weir. The outlet compartment comprises an outlet opening and is adapted to receive stormwater flowing past the second weir.

In some embodiments, the tray is adapted to direct fluid accumulating below the height of the second weir to the treatment compartment. The first weir may comprise an opening, and the tray may be adapted to direct fluid accumulating below the height of the opening to the treatment compartment. The tray may be adapted to direct fluid accumulating above the height of the second weir to the outlet compartment. In a preferred embodiment, the first weir is longer than the second weir. The tray may comprise a contoured surface, and the tray may comprise perforations for fluid flow through a bottom surface of the tray.

The treatment compartment may comprise a solid slab along a bottom portion of the treatment compartment. In some embodiments, the treatment compartment may comprise a void space along a bottom portion of the treatment compartment, with or without one or more permeable panels disposed within the void space. The treatment compartment may further comprise a peripheral floor slab and an infiltration recess in the peripheral floor slab. The treatment compartment may comprise an underdrain pipe connected to an outlet pipe extending through a bottom portion of the treatment compartment and through the infiltration recess.

The outlet compartment may comprise an interior wall adjoining adjacent sidewalls of the enclosure, with the interior wall of the outlet compartment forming the second weir. The interior wall of the outlet compartment may comprise a substantially curved surface.

Also described is an apparatus for use in a bioretention system comprising: a housing comprising four sidewalls, an inlet chamber disposed within an upper portion of the housing, a treatment chamber disposed downstream from the inlet chamber, and an outlet chamber disposed at a corner of the housing, downstream from the inlet chamber. The inlet chamber comprises first and second exterior walls, each positioned along a sidewall of the housing, and first and second interior walls, each extending through an interior of the housing. The first interior wall of the inlet chamber defines a primary passage for fluid flow, and the second interior wall defines an alternate passage for fluid flow. The treatment chamber is adapted to receive stormwater from the primary passage of the inlet chamber. The outlet chamber is adapted to receive stormwater from the alternate passage. The inlet chamber and treatment chamber may comprise a primary path for fluid flow through the housing, and the inlet chamber and outlet chamber may comprise an alternate path for fluid flow through the housing.

In some embodiments, the first interior wall adjoins adjacent sidewalls of the housing, above the treatment chamber, and the inlet chamber is adapted to direct fluid accumulating below the height of the first interior wall to the treatment chamber. The first interior wall may comprise an opening, and the inlet chamber may be adapted to direct fluid accumulating below the height of the opening to the treatment chamber. In addition, the second interior wall of the inlet chamber may adjoin adjacent sidewalls of the housing, above the outlet chamber, and the inlet chamber may be adapted to direct fluid accumulating above the height of the second interior wall to the outlet chamber. The first interior wall may be longer than the second interior wall. At least one of the first and second interior walls may comprise an arced shape. The first exterior wall may be shorter than the second exterior wall. In addition, the inlet chamber may comprise a passage for fluid flow through a bottom surface of the inlet chamber. The outlet chamber may comprise a wall adjoining adjacent sidewalls of the housing, and the wall may comprise a curved surface.

Further described is a method of treating stormwater runoff. The method comprises flowing fluid through a vault-shaped enclosure comprising an inlet opening, four sidewalls, a treatment compartment positioned at a side of the enclosure, and an exit compartment positioned at a corner of the enclosure. Fluid flow is directed from the inlet opening to an inlet compartment. The inlet compartment comprises a first weir adjoining adjacent sidewalls of the enclosure, a second weir adjoining adjacent sidewalls of the enclosure, and a tray defined at least in part by the first and second weirs. Fluid flow is directed past the first weir to treatment media disposed within the treatment compartment. At least a portion of treated fluid flow from the treatment compartment is released through an underdrain pipe disposed along a bottom portion of the treatment compartment. Fluid flow exceeding the capacity of the treatment compartment is directed to the exit compartment; and at least a portion of untreated fluid flow from the exit compartment is released through an outlet opening in the exit compartment.

DETAILED DESCRIPTION OF THE INVENTION

As used herein, the terms "comprises," "comprising," "includes," "including," "has," "having," or any other variation thereof, are intended to cover a non-exclusive inclusion. For example, processes, methods, articles, or apparatuses that comprise a list of elements are not necessarily limited to only those elements but may include other elements not expressly listed or inherent to such processes, methods, articles, or apparatuses. Further, unless expressly stated to the contrary, "or" refers to an inclusive "or" but not to an exclusive "or." For example, a condition A or B is satisfied by any one of the following: A is true (or present) and B is false (or not present), A is false (or not present) and B is true (or present), and both A and B are true (or present).

Also, the use of "a" or "an" is employed to describe the elements and components of the invention. This is done merely for convenience and to give a general sense of the invention. This description includes one or at least one, and the singular also includes the plural unless it is obvious that it is meant otherwise.

Unless otherwise defined, technical and scientific terms used herein have the same meaning as commonly understood by one of ordinary skill in the art to which this invention belongs. Although methods that are similar or equivalent to those described herein can be used in the practice or testing of the present invention, suitable methods and materials are described herein. All publications, patent applications, patents, and other references mentioned herein are incorporated by reference in their entirety. In case of conflict, the present specification, including definitions, will control. In addition, materials, methods, and examples are illustrative only and not intended to be limiting.

In the following description, numerous specific details, such as the identification of various system components, are provided to understand the embodiments of the invention. One skilled in the art will recognize, however, that embodiments of the invention can be practiced without one or more of the specific details, ordinary methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention is directed to stormwater management systems, and more particularly, biofilters, that are useful for the treatment of stormwater runoff. The biofilter may be a tree box filter that is designed to remove contaminants, such as sediment, metals, nutrients, and hydrocarbons, as well as gross pollutants and solids from stormwater runoff. A wide variety of plants, trees, and filter media, either conventional or customized media, may be used with the tree box filter. The tree box filter may be designed in various sizes, shapes, and configurations to meet particular project or landscape requirements. The tree box filter may also include one or more optional internal high flow bypass features integrated into the structure.

Figure 1:
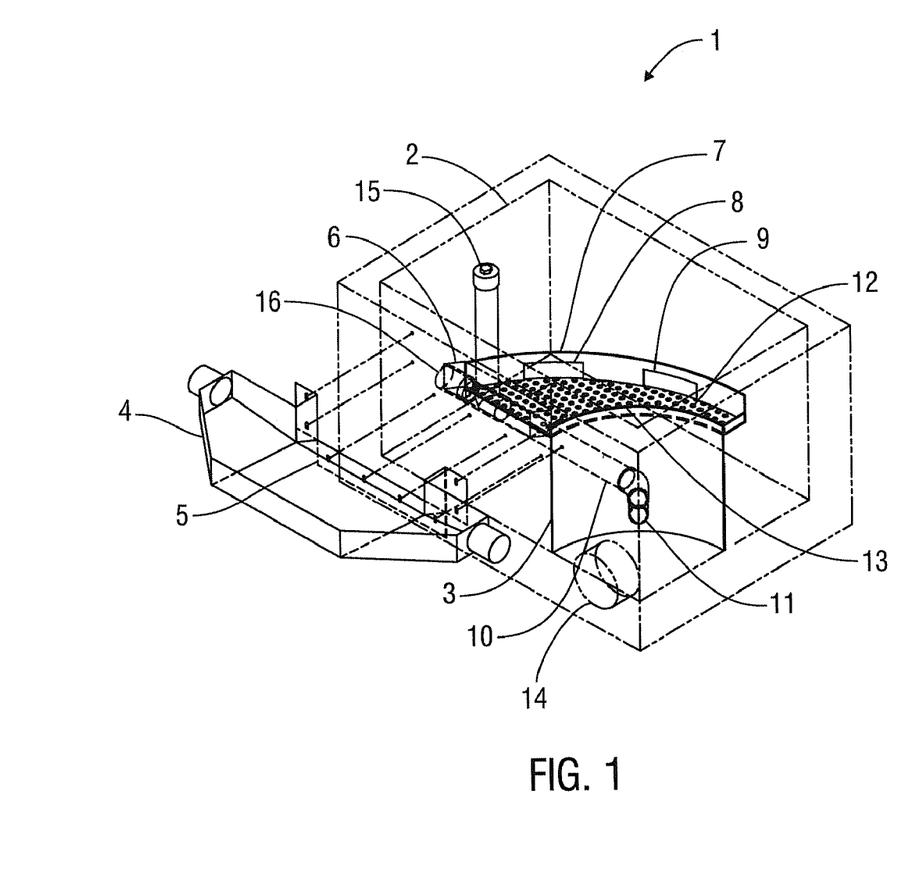
FIG. 1 illustrates schematically an isometric view of a tree box filter in accordance with one embodiment of the present invention.

Referring to FIG. 1, in one embodiment, a tree box filter 1 includes a substantially rectangular vault enclosure with four sidewalls and an optional top slab through which one or more plants, trees, shrubs, or other vegetation may extend (not shown). It will be appreciated that the tree box filter may be provided with or without a top slab. If present, the top slab may include one or more openings, for example through the incorporation of a tree grate with an opening for a tree or other plant matter. Alternatively, the top slab may be solid, without an opening for plant matter, as the tree box filter may be provided with or without plants or a tree.

The vault enclosure houses a treatment chamber 2. Here, the treatment chamber is designed to contain bioretention treatment media, such as mulch, filter media (for example, a blend of natural and/or engineered soils and other materials), and drain rock, through which stormwater runoff may be treated. The vault enclosure also houses an outlet chamber 3 through which stormwater may exit the vault. In a preferred embodiment, the vault enclosure may be primarily constructed of precast concrete; however, other materials known in the art for providing structurally sound enclosures that are capable of containing filter media also may be used.

Figure 4:
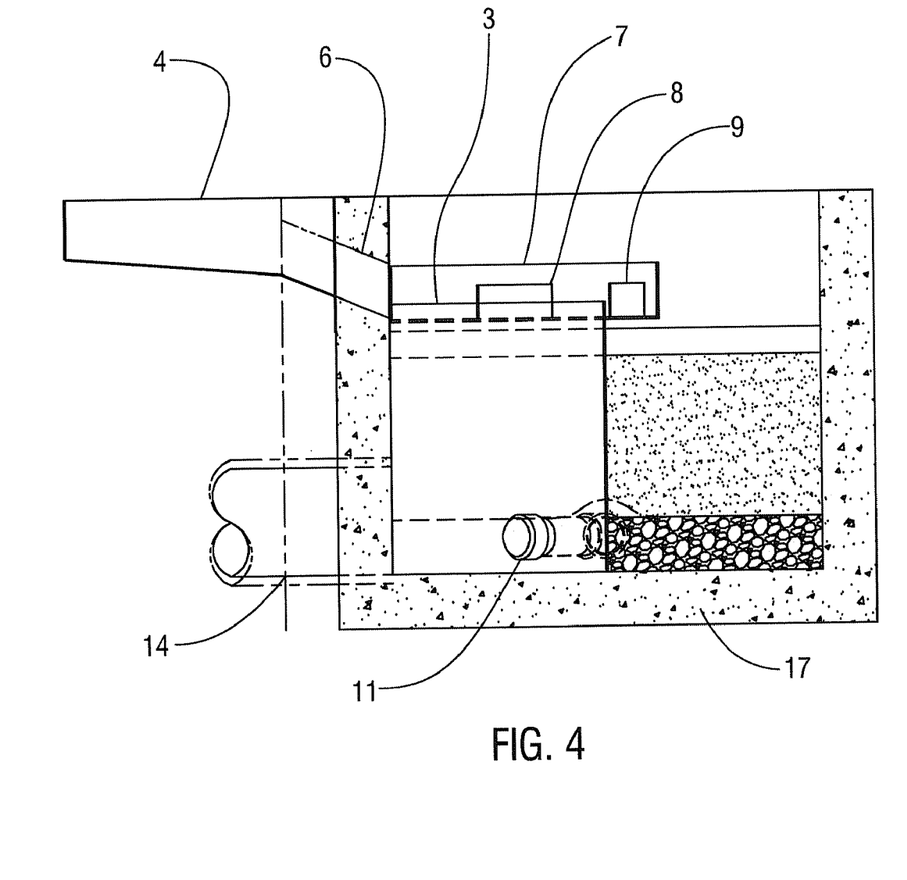
FIG. 4 illustrates schematically a cross-sectional view of another side of a tree box filter in accordance with an embodiment of the present invention.

In some embodiments, the tree box filter may be positioned along a curb to treat stormwater runoff that passes through a curb inlet opening. In those embodiments, the curb inlet opening is sized to fit along a gutter line against a curb or an edge of a path or sidewalk. The curb inlet opening extends through one of the sidewalls of the tree box filter. The curb inlet opening may be positioned along the gutter line of a parking area, roadway, paved area, or a similar area. The curb inlet opening may include exposed rebar. In some embodiments, as described in FIGS. 1 and 4, a tray 4 with a side opening 5 that corresponds with an inlet opening 6 along a sidewall of the vault may be fitted to direct stormwater through the vault.

Figure 2:
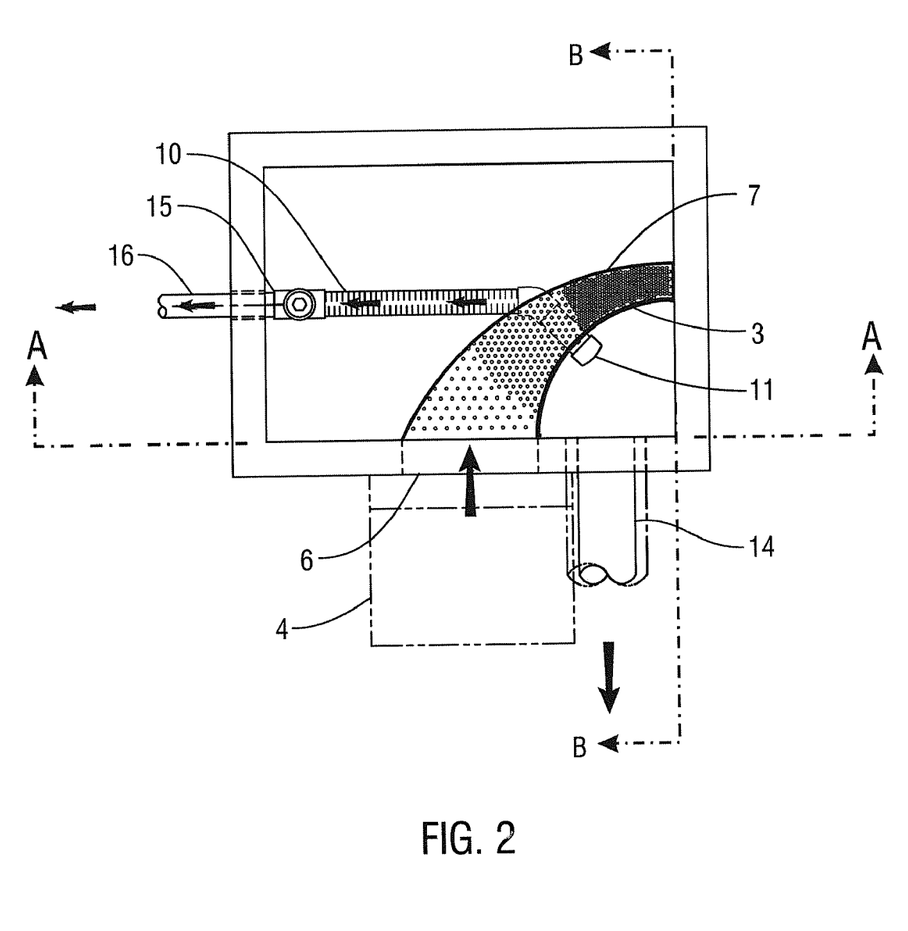
FIG. 2 illustrates schematically a top plan view of a tree box filter in accordance with an embodiment of the present invention.

The vault also includes an inlet tray or rack 7 with two sidewalls, which are attached to an upper portion of the vault along two sidewalls of the vault. The sidewalls of the rack include edges that are positioned along the sidewalls of the vault, near the exterior of the vault. In a preferred embodiment, the rack has a contoured body section that extends into an interior portion of the vault. The rack also include an interior wall, shown in this embodiment as a raised wall overlying or near the treatment chamber. The contoured rack forms a raised inlet chamber in the vault, over at least a portion of the treatment chamber. The inlet chamber also includes a raised weir overlying or near the outlet chamber (and in this embodiment, formed by a wall of the outlet chamber). The raised wall and raised weir adjoin adjacent sidewalls of the vault and include edges that extend along interiors portion of the vault. In this embodiment, the arc of the outer raised wall on the treatment chamber side is longer than the arc of the inner raised weir on the outlet chamber side, with the arc of the raised weir on the outlet chamber side dimensioned so as to form a substantially contoured-shape, as shown in FIG. 2. One sidewall of the rack is longer than the other sidewall. A longer sidewall of the contoured rack attaches to one sidewall of the vault, while a shorter sidewall of the rack attaches to an adjacent sidewall of the vault. One or more openings may be located along the raised wall positioned above the treatment chamber, between the two sidewalls of the rack.

It will be appreciated that the shapes of the raised wall and/or the raised weir in the inlet chamber may be defined by any shape or combination of shapes. Further, the interior walls of the inlet chamber may comprise a multitude of relative lengths. For example, the rack and inlet chamber need not comprise a body section, raised walls, weirs, edges, or structures that are contoured, arced or curved in shape, and each body section, wall, weir, edge, or structure need not be defined by contoured or arced segments that form a curved shape. Rather, the rack and/or inlet chamber may comprise a variety of different body sections, walls, weirs, edges, or structures of different and customizable shapes, configurations, and sizes. For instance, the rack and/or inlet chamber may comprise one or more substantially straight interior raised walls, with each wall defined by a line disposed between opposite raised walls. In some embodiments, the rack and/or inlet chamber may comprise a straight raised wall overlying or near the treatment chamber side and a curved raised weir overlying or near the outlet chamber side. In other embodiments, the rack and/or inlet chamber may comprise a curved raised wall overlying or near the treatment chamber side and a straight raised weir overlying or near the outlet chamber side. In yet other embodiments, the rack and/or inlet chamber may comprise a combination of different curved and straight portions or segments in different configurations along a single wall or weir.

Figure 3:
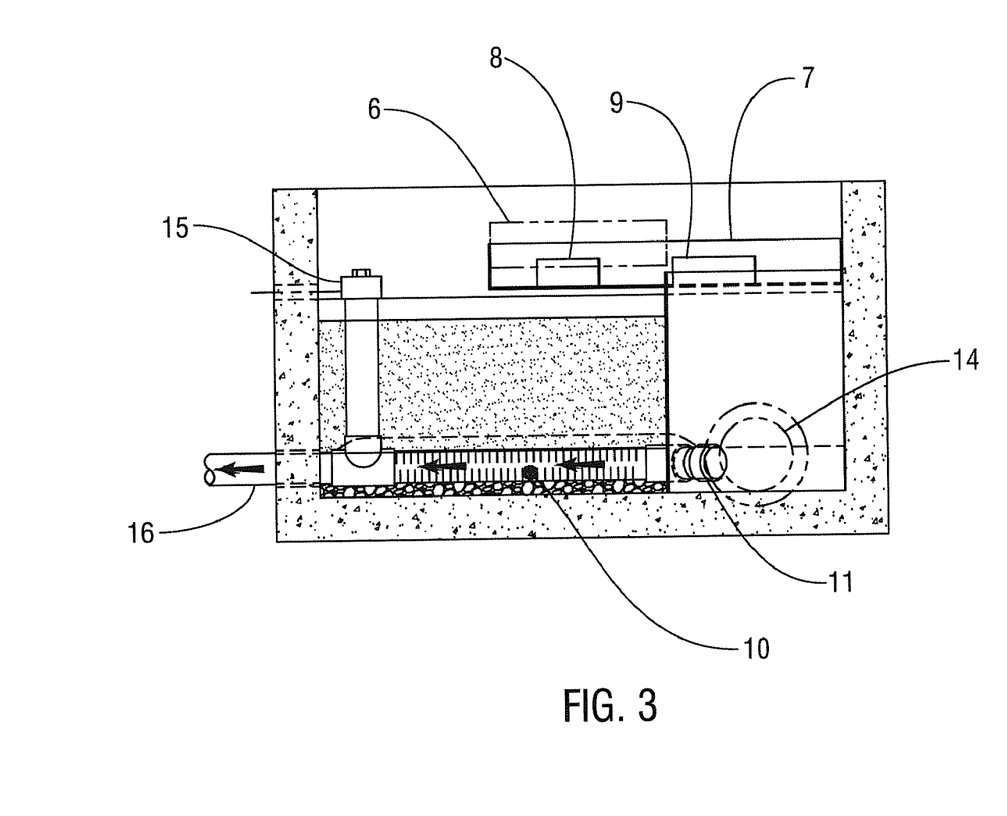
FIG. 3 illustrates schematically a cross-sectional view of an inlet side of a tree box filter in accordance with an embodiment of the present invention.

As shown in the embodiment of FIGS. 1 and 3, openings 8 and 9 along the outer raised wall of the contoured rack allow stormwater flow from the inlet chamber across the contoured rack and into the underlying treatment chamber. A perforated underdrain pipe 10 positioned along a lower portion of the treatment chamber collects at least some of the treated flow and directs the fluid to the outlet chamber through the portion of the pipe that extends through an opening in the outlet chamber wall 11. Perforations 12 located along a bottom surface of the rack also allow for stormwater flow into the treatment chamber.

The treatment chamber may include one of various bioretention or other media that are capable of treating stormwater runoff in tree box filters. A tree box filter with multiple layers of filtration media is shown in FIG. 3. In one non-limiting example, in a tree box filter with internal dimensions of approximately 6 feet long and 4 feet wide, the treatment chamber may include multiple layers of material for filtration: approximately 6 inches of underdrain material along a bottom portion, followed by approximately 18 inches of filtration material (such a combination of natural and/or engineered soils), and approximately 3 inches of mulch along a top portion. Among its benefits, the addition of a mulch layer has been shown to aid in the capture of sediment, which tends to clog the media. The sediment may be periodically removed, for example, through the use of a rake or replacement of the mulch itself, without the need to disturb the underlying filtration media.

The inlet chamber also includes a raised weir edge 13 that is positioned above, near, or along a wall of the outlet chamber, between the two sidewalls, that allows stormwater entering the inlet chamber to reach a bypass or ponding depth in the inlet chamber. The raised weir edge may be located along a weir or wall on the rack, or the raised weir edge may be located on weir or wall that is formed from a separate surface. In this embodiment, the bypass or ponding depth is defined, at least in part, by the height of the raised weir edge. In a preferred embodiment, an upper portion of the raised weir edge on the outlet chamber side is higher than an upper portion of the opening in the raised wall on the treatment chamber side. Stormwater exceeding the bypass or ponding depth of the inlet chamber is allowed to bypass the treatment chamber and enter the outlet chamber for discharge through an outlet pipe or outlet opening 14.

In a preferred embodiment, the raised weir edge in the inlet chamber may be formed from a pre-manufactured contoured surface, such as a section of a round pipe. The pipe section extends through the outlet chamber and forms an arced wall separating the treatment and bypass areas of the vault. For example, in a tree box filter with internal dimensions of approximately 6 feet in length and approximately 4 feet in width (and external dimensions of approximately 7 feet in length and approximately 5 feet in width (with 1 foot thick walls)), a round plastic pipe with a 48-inch diameter may be cut into quarter sections and used to form the outlet chamber. One of the quarter-round pipe sections may be incorporated into the vault to form an arced wall that defines at least a portion of the outlet chamber in a corner of the vault. The outlet chamber collects flow so that it may be released through an outlet pipe. In some embodiments, the wall of the outlet chamber may extend into and form one of the raised walls of the inlet chamber. In other embodiments, the wall of the outlet chamber may be aligned with one of the raised walls of the inlet chamber.

The positioning of the outlet chamber in a corner of the vault may be desirable to help reduce the footprint required for outlet (and bypass) flow and allow for increased treatment bed surface area. Among its advantages, it also may allow for a larger volume in the vault available for treatment. The use of a rounded shape may provide further efficiencies in meeting these objectives. Placement of the outlet chamber in a corner of the vault provides design flexibility, as it allows for the placement of discharge piping on either or both vault faces. In a rectangular vault, for example, one or more outlet pipes may be located in either of the structure's two outer walls, as these walls are exposed within the outlet chamber.

As discussed above, the inlet opening of the vault also may be positioned in different locations along the vault; for example, relative to an inlet opening of a curb inlet or anywhere along a sidewall of the vault. The inlet opening may be positioned anywhere along a sidewall of the vault, e.g., between two ends of the vault and parallel to the curb (or other inlet structure) to allow for better flow distribution. The placement may allow for better flow distribution relative to the treatment media. The inlet of the opening of the vault may be located closer to one side of the vault to accommodate particular landscape features, structures, or other equipment. Multiple inlet openings may also be used.

During stormwater events, or more generally, when stormwater flows through the tree box filter, the stormwater enters the vault structure through an inlet opening and into the inlet chamber formed by the contoured rack, as shown in FIG. 2. Flow that accumulates below the ponding depth of the raised weir edge in the inlet chamber is directed to the treatment chamber, either through one or more openings along the outer raised wall or through perforations along the bottom of the rack. The stormwater is then allowed to contact bioretention and/or other media that is placed in the treatment chamber. The treated flow may then enter the perforated underdrain pipe, after which it is directed to the outlet chamber and released from the vault. During periods of high flow at least a portion of the stormwater entering the inlet chamber is allowed to flow above the height of the inner raised weir edge away from the treatment chamber. The bypass flow is then directed to the outlet chamber and released from the vault.

As shown in FIGS. 1 and 2, an arced wall (formed from a sectioned pipe or other structure) separates the outlet chamber from the treatment chamber. The contour of the arced wall may also follow at least a portion of the contour of the inlet tray. In this embodiment, the contoured shape of the inlet tray facilitates the movement of water and debris toward treatment during periods of low flow and minimal ponding. The perforations on the bottom of the tray provide increased exposure to the treatment media surface. They may also facilitate flow distribution and energy dissipation of incoming water before it flows through other portions of the vault. The perforations may also allow sediments to drop onto the media surface where it is less likely to be carried downstream with the bypass flow.

Although shown in these examples as having rounded, contoured walls with one wall being shorter than the other, the inlet compartment, and more particularly, the walls of the inlet compartment, may have different shapes, sizes, and relative dimensions. The shapes, sizes, and dimensions of the inlet compartment may vary depending on factors such as: the water management application, the characteristics of the material used for construction, manufacturing considerations, the dimensions of the tree box filter (e.g., different tree box filter widths, lengths, and heights (outside and inside dimensions)), the desired weights for each tree box filter, the desired infiltration capacity, the desired treatment capacity, the desired media retention, desired filtration, and/or the desired flow rates through the tree box filter. For example, it may be desirable to incorporate a tray and/or inlet compartment with substantially straight inner and outer weir walls for ease of construction and use. In other embodiments, the walls of the inlet compartment and/or tray may include both substantially curved and substantially straight portions to accommodate internal components and/or tree box filters of different shapes. In yet other embodiments, it may also be desirable to incorporate an inlet compartment and/or tray in which the sidewalls walls are equal or substantially equal in length to facilitate fabrication and installation.

Similarly, although shown in these examples as having a semi-circular shape with a curved wall, the outlet chamber of the present invention may have different shapes, sizes, and dimensions. The shapes, sizes, and dimensions of the outlet chamber may vary depending on factors such as: the water management application, the characteristics of the material used for construction, manufacturing considerations, the dimensions of the tree box filter (e.g., different tree box filter widths, lengths, and heights (outside and inside dimensions)), the desired weights for each tree box filter, the desired infiltration capacity, the desired treatment capacity, the desired media retention, desired filtration, and/or the desired flow rates through the tree box filter. For example, it may be desirable to incorporate an outlet chamber with substantially straight walls on all sides for ease of construction and use. In other embodiments, the outlet chamber walls may include both substantially curved and substantially straight portions to accommodate internal components and/or tree box filters of different shapes. In yet other embodiments, it may also be desirable to incorporate an outlet chamber with a different number of walls that combine to form a variety of shapes formed from a variety of different surfaces (e.g., rectangular, square, circular, multi-sided, and/or irregular).

As shown in FIGS. 1 through 3, a tree box filter may also include a cleanout access pipe 15 that is connected to the underdrain pipe. The cleanout access pipe allows for periodic maintenance, inspection, flushing, and repair of the system; for example, when the underdrain pipe is clogged or otherwise obstructed. In some embodiments, the underdrain pipe may extend through a wall of the treatment chamber 16, as shown in FIG. 3. This optional extension may provide an additional outlet for stormwater flow, as well as access to the treatment chamber; for example, for the purpose of sampling treated flows before it has entered the outlet chamber. The extension may be fitted with a cap to prevent flow through the treatment chamber, as desired.

The inlet tray may be attached to the outlet chamber wall by one or more methods known in the art. As a non-limiting example, the inlet tray may be suspended from the outlet chamber wall using clips, bolts, screws, adhesives, or other fastening methods. The inlet tray may be adjusted to fit the level of the grade with which the vault is used. For example, for a surface positioned at a higher grade, the inlet tray may be attached to the outlet chamber at a higher point. Conversely, for a surface positioned at a lower grade, the inlet tray may be attached to the outlet chamber at a lower point. In some embodiments, the vault may include a screened basket on a downstream side of the bypass weir to capture large floatable debris that may become trapped in the inlet chamber during low flow and swept over the bypass weir during peak flows.

It will be appreciated that the inlet tray can be positioned anywhere along one or more sidewalls of the device. In some configurations, such as the configuration described in FIG. 1, the inlet tray may be positioned along a substantially central portion of at least one sidewall. The inlet tray also may be positioned along other areas of a sidewall; for example, in an embodiment in which the inlet, tray, and outlet chamber may be rotated 90 degrees relative to the configuration described in FIG. 1 to position the inlet on the end of the vault (short side).

Depending on the needs of a particular project or landscape, the tree box filters of the present invention may include a variety of different structures along a bottom portion of the filter. The tree box filter may include, for example, a solid bottom surface impermeable to fluid flow. In the embodiment shown in FIG. 4, for example, a solid floor slab 17 extends across the entire floor of the vault. In other embodiments, the tree box filters may include a perforated bottom surface that allows for fluid flow through the bottom of the tree box filter. The tree box filters may include an open bottom to allow for infiltration. In yet other embodiments, the tree box filters may include a combination of solid, permeable, impermeable, and open regions. The tree box filter may also be used with one of various optional liners, to adjust the infiltration rates to the surrounding soils. For example, the liner may be semi-permeable and be constructed of a geotextile or other fabric. Alternatively, the liner may be substantially impermeable to fluid flow and be constructed of suitable material, such as PVC plastic. In other embodiments, to allow for rainwater harvesting for example, the system can be encased in a non-permeable liner.

Figure 5:
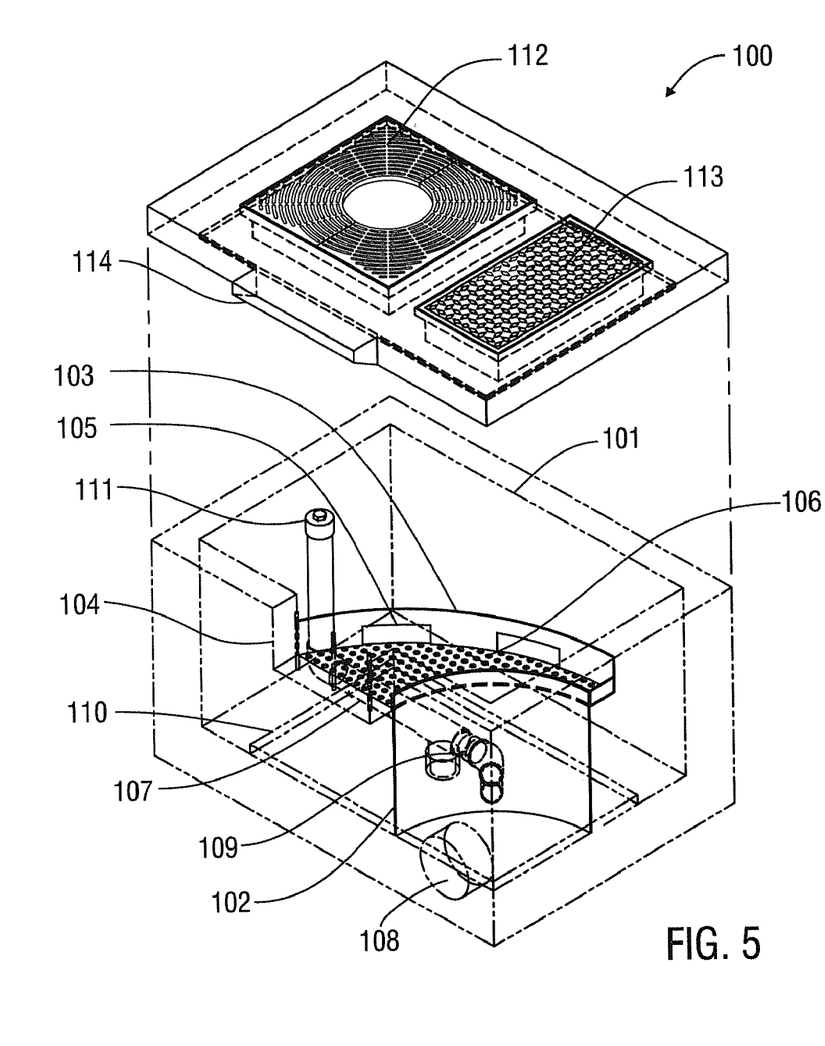
FIG. 5 illustrates schematically an isometric view of a tree box filter in accordance with one embodiment of the present invention. The tree box filter includes a recess in the floor slab and a vacant space through which stormwater may exit the tree box filter.

Referring to FIG. 5, a tree box filter according to another embodiment of the present invention is shown. The tree box filter 100 includes a rectangular vault enclosure with sidewalls that are substantially orthogonal to adjacent sidewalls and an opening in the floor that allows for infiltration. The vault houses a bioretention chamber 101 that may contain bioretention filter media (not shown) through which stormwater may be treated. The vault also houses a separate exit chamber 102 through which bypass fluid flow may exit the vault. An inlet tray 103 is attached to an upper portion of the vault along two sidewalls of the vault. The inlet tray may be positioned so that it aligns with an open throat curb inlet 104. In a preferred embodiment, the inlet tray has a contoured body section that extends into an interior portion of the vault. The contoured body section is at least partially bound by two exterior walls attached to the adjacent sidewalls of the vault enclosure and two interior raised weir walls that extend into an interior of the tree box. The inlet tray forms a raised inlet chamber in the vault, over at least a portion of the bioretention chamber. One exterior wall attaches to one sidewall of the vault near the exterior of the vault, while another exterior wall attaches to an adjacent sidewall near the exterior of the vault.

The raised weir wall positioned above, near, or along a wall of the exit chamber, between the two exterior walls allows stormwater entering the inlet chamber to bypass the bioretention chamber and enter the exit chamber for discharge during periods of high flow. In a preferred embodiment, this raised weir wall may be formed from a contoured surface, such as a section of a round pipe that extends downward through the exit chamber and forms an arc-shaped wall separating the bioretention and exit chambers.

Figure 6:
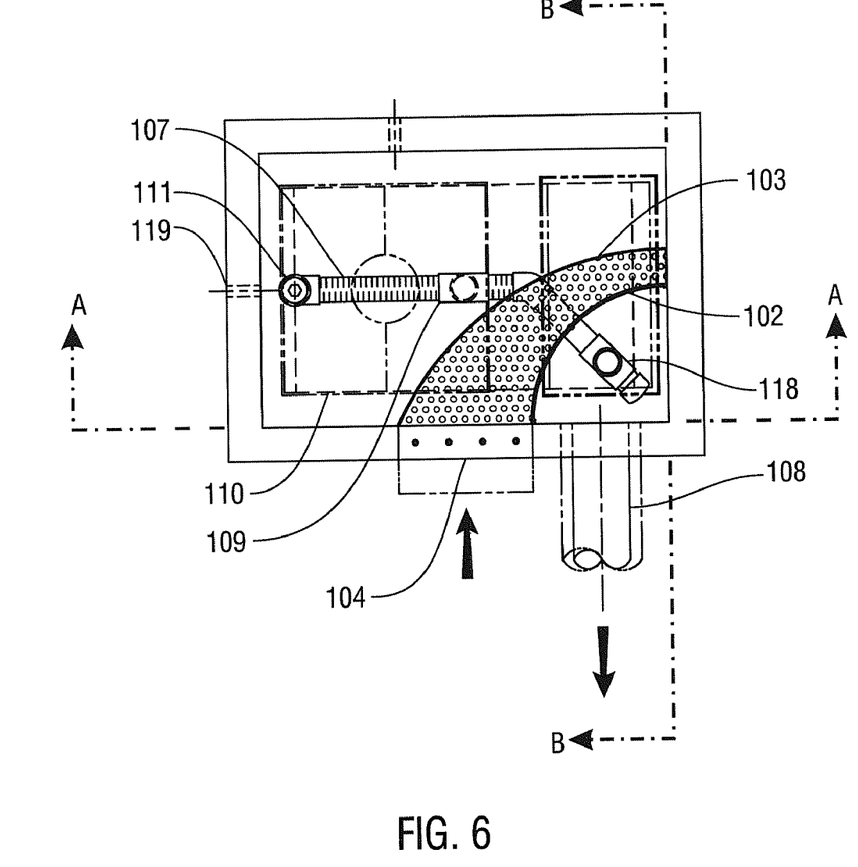
FIG. 6 illustrates schematically a top plan view of a tree box filter in accordance with an embodiment of the present invention. For clarity, the top slab is not shown, although the positions of the tree grate and access cover when the top slab is positioned over the tree box filter are identified using dotted lines. The tree box filter includes a recess in the floor slab and a vacant space through which stormwater may exit the tree box filter.

Along the other raised weir wall positioned above, near, or along a wall of the bioretention chamber and between the two exterior walls, one or more openings 105 may form one or more channels for fluid flow. The openings along this raised weir wall permit stormwater from the inlet chamber to enter the bioretention chamber. Perforations 106 located along the bottom of the tray also allow flow to enter the bioretention chamber. A perforated underdrain pipe 107 may be positioned in the bioretention chamber to direct flow through an outlet opening in the exit chamber wall through which an outlet pipe 108 may be fitted, as shown in FIG. 6.

As shown in FIGS. 5 through 8, an optional outlet 109 also may be formed along a lower portion of the bioretention chamber. The outlet opening may be fitted with a connector having a T-junction that allows flow through the infiltration recess and infiltration to the surrounding ground over which the vault is placed (e.g., the underlying soils or other materials and surfaces). In some embodiments, the recess in the floor slab 110 on the exterior vault floor allows for separation between an exterior surface of the vault and the ground. The recess under the floor provides a void area under the vault, which is available for stormwater storage until the stormwater can soak into the underlying soils. This void area may allow the interior underdrain to be piped directly through the vault floor so that treated flows can discharge to the exterior void area formed by the recess for infiltration. In further embodiments, the exterior bedding material can be amended to provide increased filtration.

In addition, in some embodiments, one or more permeable panels (not shown) may be positioned along the bottom portion of the vault above the void area to restrict or promote infiltration of the treated flow. As an example, the panels may include a rectangular grid-like matrix of permeable panels placed along a bottom of the vault. The permeability of the panels and position of panels may be selected to permit or restrict flow through the bottom portion of the vault. These hydromodification panels may have the added benefit of securing the treatment media within the vault during use, transportation, and storage of the systems. In a preferred embodiment, the recess formed by the outlet opening in the vault floor may include one or more indentations (not shown) on the outside of the bottom of the vault below the hydromodification panel to help distribute infiltration beyond the panel.

In some embodiments, the bottom of the vault may include different combinations of permeable and non-permeable regions. For example, a bottom portion of the tree box filter can be designed with different combinations of open, partially open, or closed regions that allow or restrict fluid flow through the tree box filter, to accommodate the needs of a particular site or system. One or more panels may comprise watertight material. Moreover, panels can be used together in different configurations to form underground stormwater management systems that either allow or impede the flow of fluid through that portion of the system.

A cleanout pipe 111 may be included to allow access to the bioretention chamber; for example, for maintenance, repair, and cleaning purposes. The vault may include a tree grate 112 and media cover 113. Both also may be removed to allow for additional access to the inside of the vault. A curb inlet overhang 114 on the top slab may be positioned along an upper part of the tree box filter so that the overhang is aligned with the inlet opening of the vault enclosure (and in some embodiments, an inlet curb opening).

Referring to FIGS. 5 and 6, during stormwater events or when stormwater flows through the tree box filter, the stormwater enters the vault structure through the inlet opening and into the inlet chamber formed by the inlet tray. Flow that accumulates below the height of a raised weir wall in the inlet chamber (above the bioretention chamber side) is directed to the bioretention chamber, either through perforations along the bottom of the tray or through openings along the raised weir wall. The perforations along the bottom of the inlet tray may help to distribute flow across the tray so as to avoid scouring the biofilter media (e.g., mulch and the like). In some embodiments, however, the inlet tray may include a solid, impermeable floor (or solid, impermeable regions), and normal flows are primarily directed through openings along the raised weir wall of the inlet tray.

Figure 7:
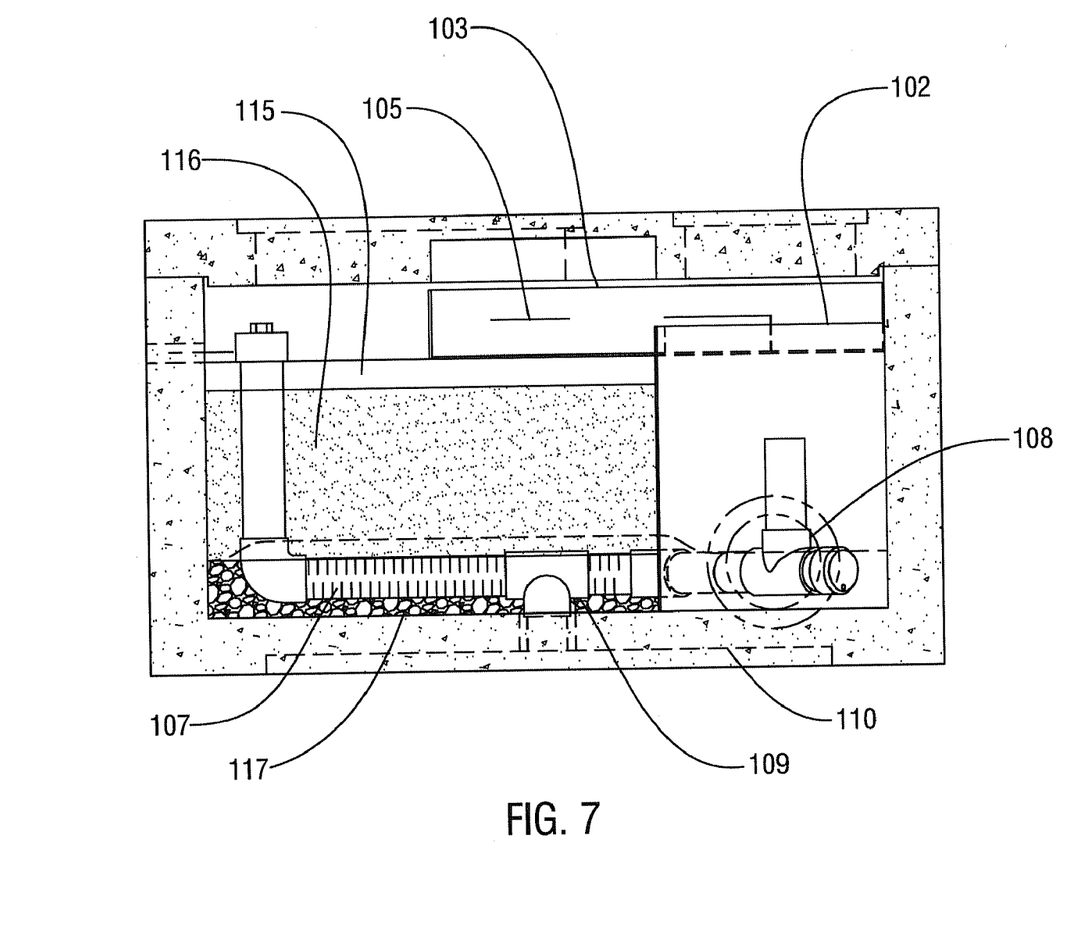
FIG. 7 illustrates schematically a cross-sectional view of an inlet side of a tree box filter in accordance with an embodiment of the present invention. The tree box filter includes a recess in the floor slab and a vacant space through which stormwater may exit the device.
Figure 8:
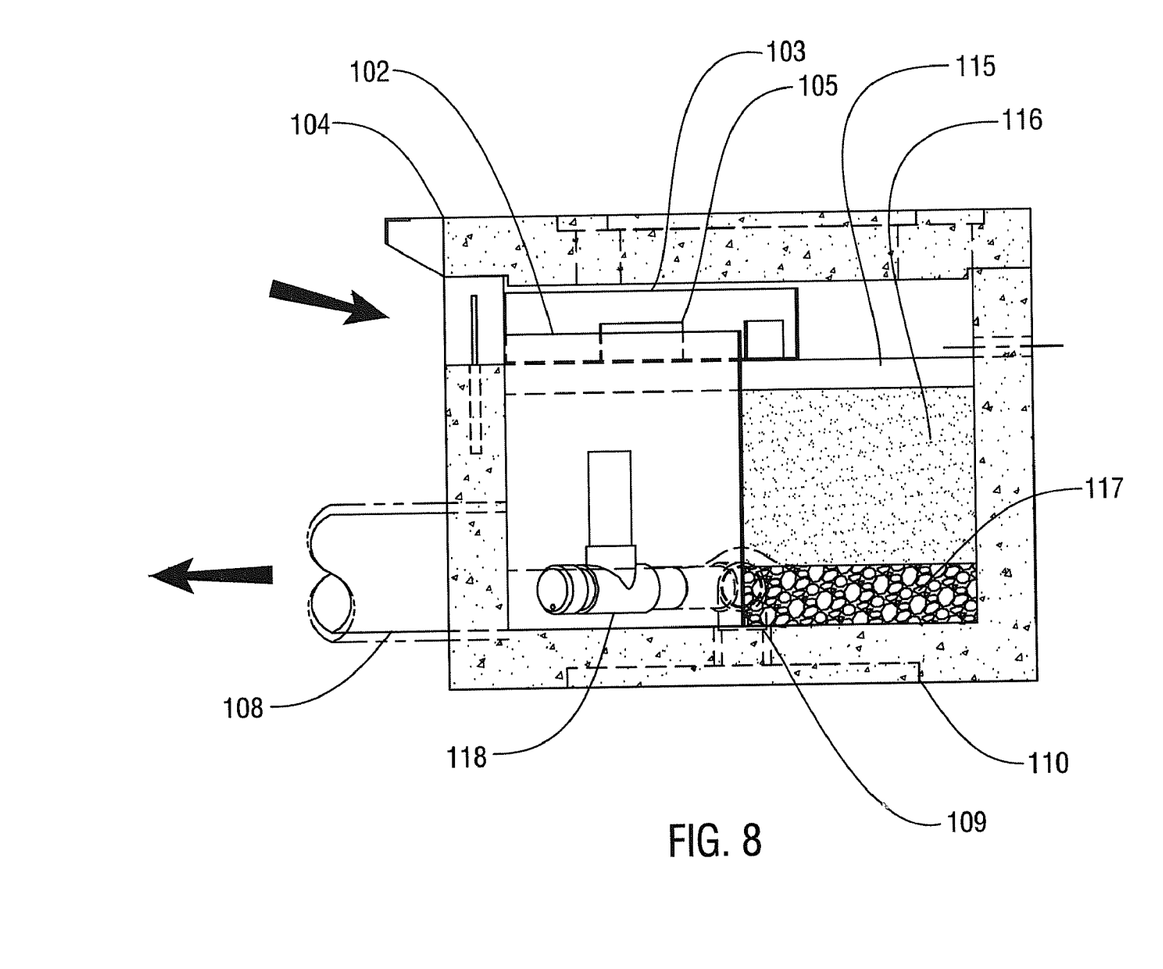
FIG. 8 illustrates schematically a cross-sectional view of another side of a tree box filter in accordance with an embodiment of the present invention. The tree box filter includes a recess in the floor slab and a vacant space through which stormwater may exit the device.

Stormwater passing to the bioretention chamber is then exposed to filter media in the bioretention chamber. In some embodiments, as shown in FIGS. 7 and 8, stormwater percolates through a layer of mulch 115, followed by filter media 116 and a layer of drain rock 117. Treated flows may then exit the vault through a vacant space in the floor slab. The treated flow may also exit the vault through an outlet 109 that passes through the bottom of the vault to an infiltration recess. Treated flows may also pass into the perforated underdrain pipe 107, after which it is directed to the exit chamber into a treated outlet assembly 118 and released from the vault. In some embodiments, the treated outlet assembly 118 may be capped to prevent flow of treated stormwater to the exit chamber, as desired. As another option, (as shown in FIG. 6) treated flows may be released through one or more irrigation ports 119 formed by the extension of the underdrain pipe through a wall of the bioretention chamber.

During periods of high flow at least a portion of the stormwater entering the inlet chamber flows over the height of the raised weir wall (on the exit chamber side) and away from the bioretention chamber. The bypass flows are directed over the raised weir wall to the exit chamber. The bypass flows are then released from the vault through an outlet pipe or other outlet opening.

These are merely illustrative examples of the various bioretention components and assemblies in some embodiments of the invention. While possible configurations, pipe couplings, and general chamber shapes are shown in the figures, it is within the scope and contemplation of the invention to introduce assemblies in other configurations using different pipe couplings, chamber configurations, and shapes. The ordinary artisan will recognize that the design of the tree box filters of the present invention may be modified in accordance with the needs of a particular landscape site or project. In some embodiments, for example, the inlet chamber may also include baffling along a top portion of the chamber to prevent backflow of floating debris to the outlet chamber.

In addition, the sizes, shapes, and dimensions discussed above are provided for illustrative purposes and are not intended to limit the scope of the invention. The ordinary artisan will recognize that the sizes of the openings and dimensions of the tree box filter and its components may be varied based on the range of design options available, such as, without limitation: the water management application, characteristics of the underdrain and other material used, manufacturing considerations, different tree box filter widths, lengths, and heights (outside and inside dimensions), materials used for construction, desired weights for each tree box filter, desired infiltration capacity, desired treatment capacity, desired media retention, desired filtration, and/or the desired flow rates through the tree box filter. For example, the sizes and shapes of the openings and passages may be adjusted to accommodate different flow rates. Similarly, the number of openings may be enlarged or scaled down to allow for increased or decreased stormwater flow, respectively.

As known by those of skill in the art, the number, shapes, and dimensions of the chambers, bays, pods, and/or compartments used it the tree box filter may vary to accommodate different design considerations, such as different widths, lengths, and heights (outside and inside dimensions), desired weights for each tree box filter, and water flow volumes. Different configurations and orientations may be used depending on the requirements of a particular landscaped site and particular landscape features. For example, in a rectangular vault system, an outlet chamber may be positioned in any of the four corners, including adjacent to a curb inlet. The ability to modify this positioning may provide more flexibility in site layout applications.

The vault chambers, bays, pods, and/or compartments may be placed in different configurations and orientations in accordance with other embodiments of the present invention. In some embodiments, the inlet chamber and corresponding inlet opening may be positioned along different parts of the vault and on different sidewalls, to accommodate flow from different surfaces and areas. Multiple inlet openings may be used. And in some embodiments, the bypass chamber may be positioned along other areas of the vault (along a side or end of the vault, for example), as may be the treatment chambers.

The structure of the tree box filters described above greatly facilitates the fabrication and construction of underground systems. Both simple (e.g., adjoining of the same tree box filter or chamber assemblies) and more complex systems (e.g., use of multiple modular tree box filters and/or chamber assemblies with outlet flow control, cartridges, water filtration systems, and other features) of inter-connected structures can be built that provide sufficient load bearing strength and structural integrity for a wide range of underground water management applications. The variation in the types and features of the different tree box filters allows for customization according to the particular needs of a landscape area. For example, multiple chambers may be included for increased flow capacity and enhanced treatment. In some instances, additional chambers or multiple pods may be connected to allow for modular systems that may be expanded or scaled-down to meet the requirements of a particular project. The tree box filters may be used with additional external structures, such as one or more external catch bins for bypass flows. Moreover, the chambers described in this invention (e.g., inlet, treatment, and outlet chambers) may be separated by one or more intermediate chambers to allow for additional treatment, water storage, gross pollutant retention, or and/or fluid flow. In some embodiments, the tree box filter may allow for additional pretreatment of stormwater either through internal or external structures to prolong the life of the filtration media and simplify maintenance by removing at least some of the gross pollutants in a separate area.

The features described in this invention may be modular and removable to allow for customization, component replacement, and added design flexibility. For example, the inlet tray may be formed from one or more removable structures. Thus, for areas in which the flow is anticipated to remain within the flow capacity of the tree box filter, the tree box filter may be used without the inlet tray and the internal bypass feature. In other embodiments, external bypass units may be added to the tree box to accommodate peak flows, and bypass flows would continue downstream from the vault. Similarly, the contoured wall of the outlet chamber may be removable, to allow for the use of additional media and to allow for additional bioretention treatment capacity.

The ordinary artisan also will recognize that the absolute dimension of the holes, slots, and openings can be selected to accept industry standard pipe connections/fittings (e.g., rubber boots). In the embodiments described in FIGS. 1 and 5, for example, the pipe openings are shown as substantially rounded; however, any of a multitude of complementary shapes allowing fluid flow through the module and well known to the ordinary artisan could be used. Such fittings can offer flexible and watertight connections between modular components and piping for controlling water flow into and out of an assembly of modular components.

As discussed above, the shapes of the tree box and its components are provided as examples and are not intended to limit the scope of the invention. For example, as described in the above embodiments, the inlet tray may be generally contoured in shape and define a contoured arc-shaped inlet chamber along a top portion of the tree box filter vault. The inlet tray, however, can be in a range of customized shapes (e.g., rectangular, circular, oval, generally round, or irregular), configurations, and sizes to fit different applications. The inlet tray may also be placed in different positions, with additional trays used as needed, to meet the needs of a particular landscaped area. In addition, it will be appreciated that the features and components described above, such as the inlet trays, walls, weirs, slabs, tree box compartments, and its various components, may comprise unitary structures, pieces, parts, walls, portions, or segments; or a combination of multiple structures, pieces, parts, walls, portions, or segments.

The ordinary artisan will recognize that materials commonly used in applications involving underground retention/detention of water can be employed in the present invention. For example, in various embodiments of the present invention, materials useful for construction of the tree box filters, include but are not limited to: concrete, precast concrete, polypropylene, high-density polyethylene (HDPE), low-density polyethylene (LDPE), rubber, aluminum or any other materials that can be molded or cast for water loading. Further, the bioretention system of the present invention may be constructed as a one-piece design that provides structural integrity and integral foundation. Alternatively, it can be constructed of separate component, units, or "modules" that are assembled to form the system.

The above disclosures are sufficient to enable one of ordinary skill in the art to practice the invention, and provide the best mode of practicing the invention presently contemplated by the inventors. While there is provided herein a full and complete disclosure of specific embodiments of this invention, it is not desired to limit the invention to the exact construction, dimensional relationships, and operation shown and described. Various modifications, alternative constructions, design options, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

What is claimed is:

1. An apparatus for use in a bioretention system comprising:
    (a) a substantially rectangular enclosure comprising an inlet opening and four sidewalls;
    (b) a tray in fluid communication with the inlet opening and defined at least in part by:
        (i) a first weir comprising a first continuous edge adjoining a pair of substantially perpendicular sidewalls of the enclosure,
        (ii) a second weir comprising a second continuous edge adjoining the pair of substantially perpendicular sidewalls of the enclosure, and
        (iii) an attachment wall disposed between the first and second weirs and along one of the substantially perpendicular sidewalls of the enclosure;
    (c) a treatment compartment disposed downstream from the tray, wherein the treatment compartment comprises treatment media and is adapted to receive stormwater flowing past the first weir; and
    (d) an outlet compartment disposed at a corner of the enclosure, downstream from the tray, wherein the outlet compartment comprises an outlet opening and is adapted to receive stormwater flowing past the second weir.

2. The apparatus of claim 1, wherein the outlet compartment further comprises an interior wall adjoining adjacent sidewalls of the enclosure, and the interior wall of the outlet compartment forms the second weir.

3. The apparatus of claim 1, wherein the tray is adapted to direct fluid accumulating below the height of the second weir to the treatment compartment.

4. The apparatus of claim 3, wherein the first weir comprises an opening, and the tray is adapted to direct fluid accumulating below the height of the opening to the treatment compartment.

5. The apparatus of claim 1, wherein the tray is adapted to direct fluid accumulating above the height of the second weir to the outlet compartment.

6. The apparatus of claim 1, wherein the first weir is longer than the second weir.

7. The apparatus of claim 1, wherein the tray comprises a contoured surface.

8. The apparatus of claim 1, wherein the tray comprises perforations for fluid flow through a bottom surface of the tray.

9. The apparatus of claim 1, wherein an interior wall of the outlet compartment comprises a substantially curved surface.

10. The apparatus of claim 1, wherein the treatment compartment comprises a solid slab along a bottom portion of the treatment compartment.

11. The apparatus of claim 1, wherein the treatment compartment comprises a void space along a bottom portion of the treatment compartment.

12. The apparatus of claim 11, wherein the treatment compartment further comprises one or more permeable panels disposed within the void space.

13. The apparatus of claim 11, wherein the treatment compartment further comprises a peripheral floor slab and an infiltration recess in the peripheral floor slab.

14. The apparatus of claim 13, wherein the treatment compartment comprises an underdrain pipe connected to an outlet pipe extending through a bottom portion of the treatment compartment and through the infiltration recess.

* * * * *